UNITED STATES PATENT OFFICE.

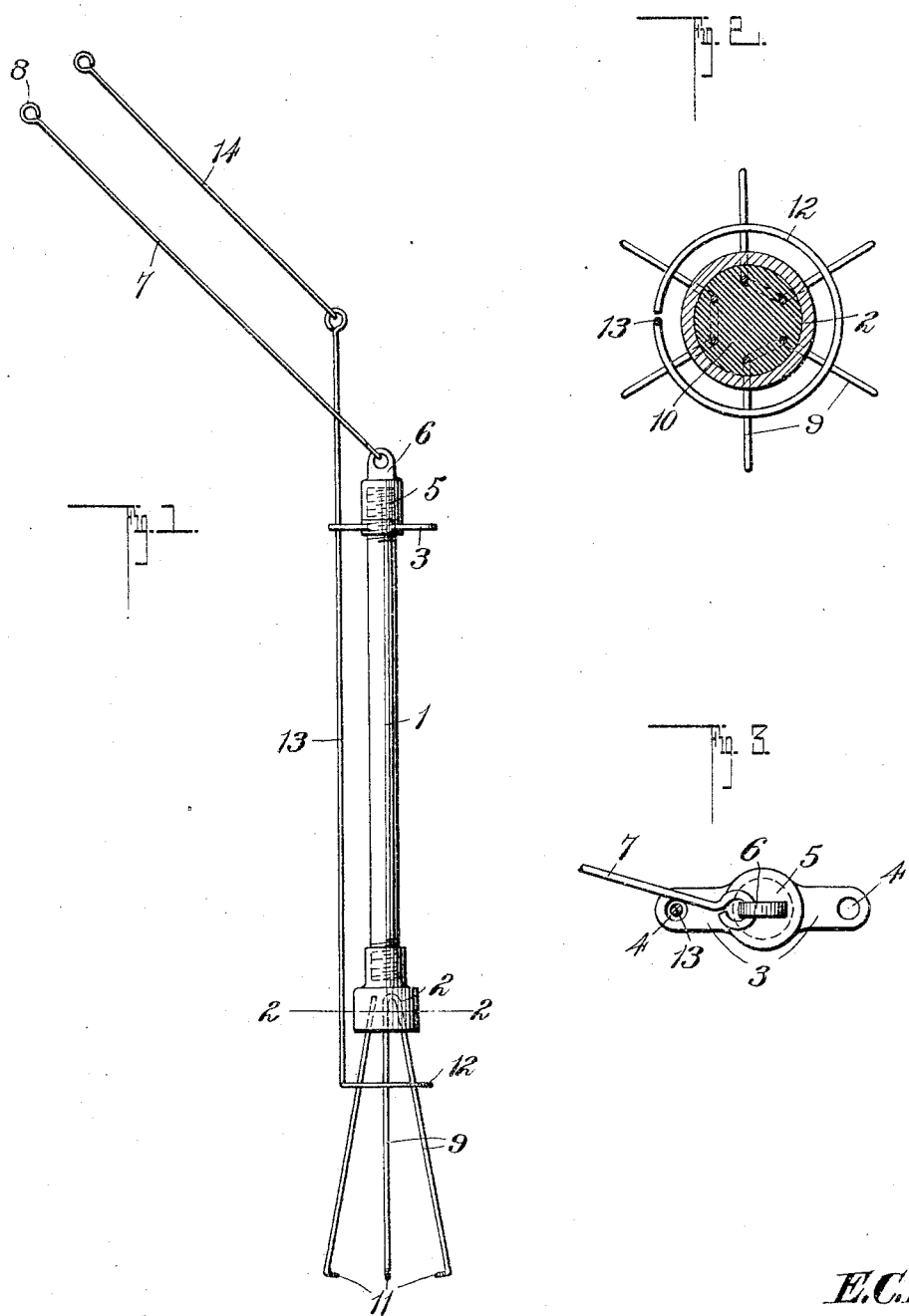

EDWARD C. FRAW, OF JEFFERSON, OHIO.

HOPPER-CLOSET GRAPPLING-HOOK.

958,915.  Specification of Letters Patent.  Patented May 24, 1910.

Application filed May 29, 1909. Serial No. 499,127.

*To all whom it may concern:*

Be it known that I, EDWARD C. FRAW, a citizen of the United States, residing at Jefferson, in the county of Ashtabula and State of Ohio, have invented a new and useful Improvement in Hopper - Closet Grappling-Hooks, of which the following is a specification.

This invention relates to a grappling device designed for cleaning out underground traps and sewer pipes, and especially adapted for use in basements, cellars and in other places where a long rigid rod or pole could not be conveniently used.

The invention consists of a folding handle grappling device carried at one end of the handle and means slidable upon said handle for opening and closing the grappling hooks, said slidable means being operated by a second handle which also folds upon the first.

The invention consists of the novel features of construction hereinafter fully described, pointed out in the claims, and shown in the accompanying drawings, in which:

Figure 1 is a side elevation. Fig. 2 is a section on the line 2—2 of Fig. 1. Fig. 3 is a top plan view of Fig. 1, a rod being in section.

In these drawings 1 represents a tubing which may be of three-eighth inch gas pipe and which has threaded upon its lower end an ordinary reducing coupling 2. Adjacent its upper end I thread upon the pipe 1 a plate 3 which plate is provided with guide eyes 4, said guide eyes being arranged adjacent opposite ends of the plate and upon opposite sides of the pipe 1. A cap 5 is threaded upon the upper end of the pipe 1, said cap being provided with an upwardly extending perforated ear or lug 6. These parts form the lower portion of a sectional handle, the upper section of said handle being formed by a rod 7 which is bent to engage the perforated ear 6 and which can be folded upon the pipe 1. The upper end of the handle portion 7 is also bent as shown at 8 for the purpose of forming a hand grip, and it may be made of a size suitable to receive the thumb, or may be bent to form a circle large enough to receive the hand.

In the larger end of the reducing coupling 2 I insert spring wires 9, said wires being preferably three in number and being bent upon themselves with their bow portions inserted in the coupling member and the said wires are secured in said member by any suitable means, such as a retaining plug of soft lead which is hammered or tamped into the said coupling member as shown at 10. The outer ends of the spring wires 9 are bent inwardly to form hooks 11, and the outer ends of the wires normally spring apart. To force the said hooked ends together in order to form a grappling hook of the wires 9, I provide a ring 12 which slides upon said wires and this ring is moved toward and away from the coupling member by means of a rod 13 secured to the ring 12 and working through either of the guide eyes 4. The rod 13 is also provided with a folding section 14.

In this device the spring wires form a grappling hook held by a folding holding handle formed of the pipe 1 and rod 7, and operated by a folding operating handle formed of the rods 13 and 14, the holding handle being held by one hand and the operating handle by the other. By forming two guide eyes 4, the operating handle can be placed upon either the right or left hand side of the holding handle.

It will be obvious that by inserting the holding handle into the pipe and passing it into the trap to be cleaned any material which may have been collected in said trap will be gripped by the grappling hooks by moving the operating handle so as to move the ring 12 toward the hook ends of the wires, thus causing said wires to close upon and grip anything which may lie between them.

What I claim is:

1. A device of the kind described comprising a handle, a coupling member rigidly secured to the handle, a plurality of wires bent upon themselves and having their bow portions secured in said coupling member and their free ends bent inwardly to form hooks, a ring sliding on said wires, an operating handle for moving said ring, and a guide plate carried by the first mentioned handle and through which the operating handle passes.

2. In a grappling hook, a holding handle formed of two sections adapted to fold upon each other, spring wires carried by said holding handle, the free ends of said wires normally diverging, a ring slidable on said wires, an operating handle, formed of two sections foldable upon themselves, said handle being connected to the ring, and means carried by the holding handle for guiding one section of the operating handle, as and for the purpose set forth.

EDWARD C. FRAW.

Witnesses:
 HENRY STACK,
 JOHN PHELAN.